(12) United States Patent
Czaplicki et al.

(10) Patent No.: US 8,921,009 B2
(45) Date of Patent: Dec. 30, 2014

(54) PROCESS FOR FUEL CELL FORMATION

(75) Inventors: Michael Czaplicki, Rochester Hills, MI (US); Karsten Scholz, Molsheim Cedex (FR)

(73) Assignee: Zephyros, Inc., Romeo, MI (US)

( * ) Notice: Subject to any disclaimer, the term of this patent is extended or adjusted under 35 U.S.C. 154(b) by 95 days.

(21) Appl. No.: 13/561,442

(22) Filed: Jul. 30, 2012

(65) Prior Publication Data
US 2014/0030624 A1 Jan. 30, 2014

(51) Int. Cl.
*H01M 8/02* (2006.01)
*H01M 8/24* (2006.01)
*H01M 8/00* (2006.01)

(52) U.S. Cl.
CPC *H01M 8/00* (2013.01); *Y02E 60/50* (2013.01); *H01M 8/2465* (2013.01); *H01M 8/24* (2013.01); *H01M 8/02* (2013.01)
USPC ........... 429/535; 429/452; 429/507; 429/508; 429/509; 427/115

(58) Field of Classification Search
USPC .................. 429/452, 507–510, 535; 427/115
See application file for complete search history.

(56) References Cited

U.S. PATENT DOCUMENTS

| | | | |
|---|---|---|---|
| 3,907,623 A * | 9/1975 | Dowbenko | ...................... 156/77 |
| 3,944,631 A | 3/1976 | Yu et al. | |
| 3,984,497 A | 10/1976 | Owens et al. | |
| 4,034,013 A | 7/1977 | Lane | |
| 4,096,202 A | 6/1978 | Farnham et al. | |
| 4,304,709 A | 12/1981 | Salee | |
| 4,306,040 A | 12/1981 | Baer | |
| 4,495,324 A | 1/1985 | Chacko et al. | |
| 4,536,436 A | 8/1985 | Maeoka et al. | |
| 5,628,861 A | 5/1997 | Segal | |
| 6,245,139 B1 | 6/2001 | Nicholls | |
| 6,509,128 B1 | 1/2003 | Everaerts et al. | |
| 6,660,352 B2 | 12/2003 | Hsu et al. | |
| 7,481,884 B2 | 1/2009 | Stelter et al. | |
| 7,722,978 B2 | 5/2010 | Artibise et al. | |
| 7,749,636 B2 | 7/2010 | Scherer et al. | |
| 7,824,821 B2 | 11/2010 | MacKinnon et al. | |
| 7,892,396 B2 | 2/2011 | Sheasley | |
| 7,914,943 B2 | 3/2011 | Woznicka et al. | |
| 2002/0107318 A1 * | 8/2002 | Yamada et al. | ................ 524/495 |
| 2002/0177027 A1 * | 11/2002 | Yeager et al. | ................... 429/34 |

(Continued)

FOREIGN PATENT DOCUMENTS

| | | |
|---|---|---|
| EP | 1479742 | 11/2004 |
| JP | 01185351 A * | 7/1989 |
| WO | 98/22544 | 5/1998 |
| WO | 2011/141148 A2 | 11/2011 |

OTHER PUBLICATIONS

Electromagnetic Brush Technology Technical Article; Electromagnetic brush powder coating: from the lab to commercial production; Peter Kloppers; EMB Technology (2002).

(Continued)

*Primary Examiner* — Gregg Cantelmo
(74) *Attorney, Agent, or Firm* — The Dobrusin Law Firm, PC

(57) ABSTRACT

An improved approach toward manufacture of a sealed fuel cell stack configuration including electrostatic deposition of materials onto substrate surfaces of the fuel cell stack.

18 Claims, 4 Drawing Sheets

(56) References Cited

U.S. PATENT DOCUMENTS

| | | |
|---|---|---|
| 2004/0166392 A1* | 8/2004 | Shah et al. .................... 429/36 |
| 2004/0204551 A1 | 10/2004 | Czaplicki et al. |
| 2005/0031933 A1 | 2/2005 | Blunk et al. |
| 2005/0208700 A1 | 9/2005 | Kwon et al. |
| 2007/0088138 A1 | 4/2007 | Czaplicki |
| 2007/0215992 A1 | 9/2007 | Shen et al. |
| 2008/0191174 A1 | 8/2008 | Ehrensvard et al. |
| 2008/0268166 A1 | 10/2008 | Rickert et al. |
| 2010/0122770 A1 | 5/2010 | Gruber et al. |
| 2010/0167105 A1 | 7/2010 | Finsterwalder et al. |
| 2010/0209802 A1 | 8/2010 | Armstrong et al. |
| 2011/0318667 A1 | 12/2011 | Miller et al. |

OTHER PUBLICATIONS

Extended Search Report dated Nov. 17, 2014; Application No. 13177639.5.

* cited by examiner

PROCESS FOR FUEL CELL FORMATION

FIELD OF THE INVENTION

The present invention generally relates to fuel cell manufacture, and more particularly to an improved approach toward manufacture of a sealed fuel cell stack configuration.

BACKGROUND OF THE INVENTION

With the increasing efforts to reduce dependency upon petroleum based fuels, there has been a movement toward alternative energy sources. One technology that has seen increased attention in recent years has been fuel cell technology. In a typical fuel cell, electricity is derived electrochemically by reactions typically carried out with fluidic reactants and what is known in the art as a membrane electrode assembly (MEA). Typically, multiple MEAs are electrically combined in series, parallel or both to form a fuel cell stack. MEA structures will typically employ a membrane sandwiched between anode and cathode sheets. A catalyst may be included within an MEA. In turn, the MEAs are provided between current collectors in the form of plates, such as bipolar plates. Such bipolar plates may be specifically configured with one or more channel structures through which reactants are flowed, or through which reaction product flows. As can be appreciated, there is a need to isolate active components of a fuel cell. For example, the portions of the fuel cell exposed to reactants and/or other fluids and chemicals need to be isolated from the portions exposed to reaction products. As well, it is desirable to contain the system from the surrounding environment. Accordingly, the art has recognized that fuel cell stacks should be sealed. Efforts to seal components of fuel cells have been described in various prior publications, such as U.S. Pat. Nos. 7,722,978; 7,824,821 and 7,914,943.

Some fuel cells herein may be polymer electrolyte membrane type fuel cells. A polymer electrolyte membrane fuel cell may make use of an electrochemical reaction using a polymeric electrolyte. For example, an electrochemical reaction involving conversion of hydrogen and oxygen to water may involve oxidation and reduction partial reactions, and may employ a proton-conducting membrane between anode and cathode electrodes. Such fuel cells are commonly operated at a temperature in the region in excess of 50° C., and even as high as 90° C. or higher, and thereby subject materials used for the components to relatively high temperatures. As a result, over time, the potential for polymer material degradation at such temperatures tends to limit the ability to use such polymeric components, or requires that such components be used in relatively large amounts to assure robust performance.

To date, however, the ability to achieve high integrity sealing has been limited. For example, due to the demanding environments in which the fuel cells will be operated, the ability to employ a range of sealing materials has been curtailed. Further, the need to apply sealing material in sufficient thicknesses needed to achieve the desired sealing performance has compromised the ability to make fuel cells more compact and lighter in weight. In this regard, the push toward the use of thinner and more fragile sheet materials renders the use of some sealing materials impractical. Accordingly, there remains a need in the art for the improved manufacture of fuel cell stacks and sealed fuel cell assemblies, which are relatively compact, durable, relatively light in weight, and/or which can be employed with relatively thin fuel cell component materials without detrimentally affecting the performance of the component materials.

SUMMARY OF THE INVENTION

The present teachings meet one or more of the above needs by providing a method for forming a fuel cell stack, comprising the steps of providing a plurality of die-cut stainless steel sheets each having (i) a thickness of less than about 0.2 mm, (ii) a first face, and (iii) an opposing second face. The method further provides for use of an electromagnetic brush printing apparatus to electrostatically deliver a precursor layer having a generally uniform thickness of less than about 0.3 mm onto the first face of each of the die-cut stainless steel sheets, wherein the precursor layer has particles having an average diameter of less than about 125 microns. The precursor layer may include a one component substantially solid precursor formulation including a 4-type solid bisphenol A based epoxy in an amount greater than about 80 percent by weight of the composition. The precursor layer may further include a solid epoxy-CTBN adduct, having an epoxide equivalent weight of about 1500 g/mole, the solid epoxy-CTBN being present in an amount of between about 1:5 to about 1:6 parts by weight relative to the 4-type solid bisphenol A based epoxy. The precursor layer may also include a dicyanamide curing agent in an amount of less than about 4 percent by weight of the composition, and at least one pigment may also be included in an amount for imparting a visibly detectable contrast between the precursor layer and the die-cut stainless steel sheet. The particles of the precursor layer may then be physically transformed to form a precursor layer film that is tack-free and dry to the touch while on a respective die-cut stainless steel sheet to which it has been delivered and thereby forming at least a temporary adhesive bond between the precursor layer and such die-cut stainless steel sheet. Each precursor layer film may then be heated to a temperature above a cross-linking activation temperature for cross-linking the 4-type solid bisphenol A based epoxy and the solid epoxy-CTBN adduct to define a cured cross-linked reaction product material.

A stack may then be formed of at least about 200 of the die-cut stainless steel sheets having the cross-linked reaction product thereon by stacking consecutive sheets so that one or more first faces of the sheets oppose one or more second faces of the sheets with a respective cross-linked reaction product layers therebetween, and thereby defining an outermost cross-linked reaction product layer. A die-cut stainless steel cover sheet may then be applied over the outermost cross-linked reaction product layer thereby defining a fuel cell stack. In an alternative embodiment, the precursor layer film may be heated to a temperature above a cross-linking activation temperature for cross-linking the 4-type solid bisphenol A based epoxy and the solid epoxy-CTBN after assembly of the fuel cell stack.

Alternatively, the stack may be formed by a plurality of bipolar cells each comprising at least three sheets and at least two precursor layer films such that a film layer is located in between each pair of sheets.

The step of physically transforming the particles may occur prior to stacking adjoining sheets upon each other. The step of heating each precursor layer film may occur, prior to the step of stacking. The step of physically transforming the particles may include a step of heating the particles to a temperature of at least 80° C. less than the temperature for the step of heating each precursor layer film. The step of physically transforming the particles may include heating the particles to a temperature at which the precursor composition softens and flows as a thermoplastic material, but below which it will cross-link for forming a thermoset material.

In another aspect, the present teachings include a fuel cell comprising a fuel cell stack prepared using the methods described herein. In yet another aspect, the present teachings provide for a fuel cell stack, comprising a plurality of die-cut stainless steel sheets each having (i) a thickness of less than about 0.2 mm, (ii) at least one first face, and (iii) at least one opposing second face, and a layer selectively disposed between one or more of the sheets of a cured cross-linked reaction product layer. The reaction product may be a one component formulation comprising a 4-type solid bisphenol A based epoxy in an amount greater than about 80 percent by weight of the composition, a solid epoxy-CTBN adduct, having an epoxide equivalent weight of about 1500 g/mole, the solid epoxy-CTBN being present in an amount of between about 1:5 to about 1:6 parts by weight relative to the 4-type solid bisphenol A based epoxy, a dicyanamide curing agent in an amount of less than about 4 percent by weight of the composition, and at least one pigment in an amount for imparting a visibly detectable contrast between the reaction product layer and the die-cut stainless steel sheet. The layer selectively disposed between each of the sheets may be of sufficient thickness and is located so as to define a gap into which a fluidic material can be introduced to form a fuel cell.

DETAILED DESCRIPTION

In general, the teachings herein provide for a fuel cell stack including a plurality of die-cut stainless steel sheets, a portion of each of the stainless steel sheets including a precursor layer located thereon, whereby the precursor layer is physically transformed to form a precursor layer film that can be subsequently activated to form a cured cross-linked reaction product.

Figure 1:
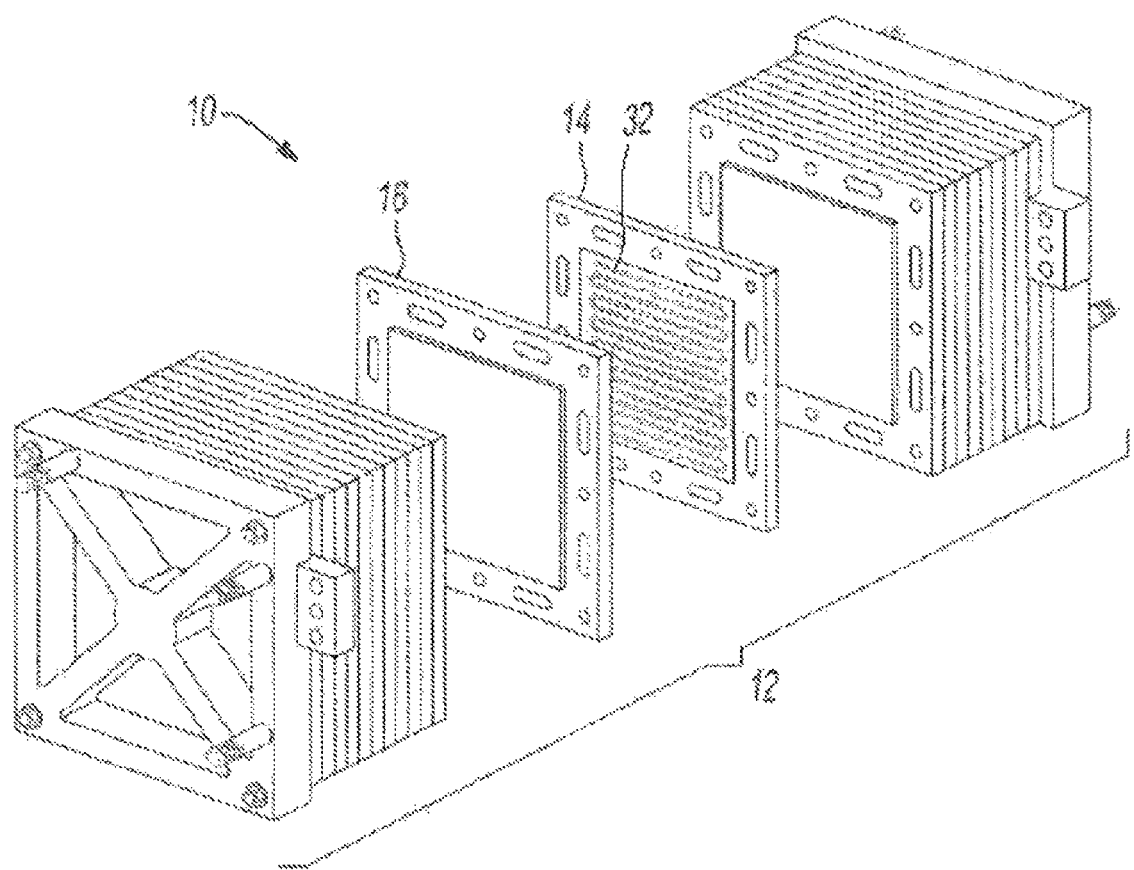
FIG. 1 shows a portion of an exemplary fuel cell in accordance with the present teachings.
Figure 2:
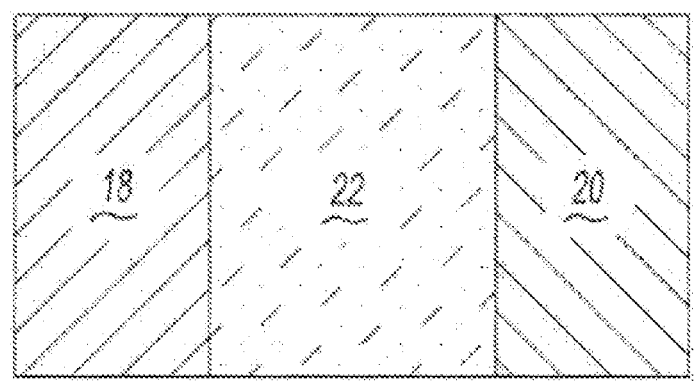
FIG. 2 shows an exemplary membrane portion in accordance with the present teachings.

As shown for example in FIG. 1, a fuel cell assembly 10 according to the teachings herein will typically include at least one fuel cell stack 12. The stack 12 will include a plurality of substrates 14 (e.g., plates, such as a bipolar plate). At least one pair of substrates will include substrates that are in opposing spaced relation to each other and will have a membrane electrode assembly 16 sandwiched between the substrates. As shown for example in FIG. 2, the membrane electrode assembly 16 will in turn include an anode 18, a cathode 20 and a membrane 22 between the anode and the cathode. The membrane functions to permit transfer of protons as between the anode and the cathode sides. The membrane may have a catalyst coated thereon.

One car more of the substrates may have a bipolar plate structure. An example of a bipolar plate structure may include opposing sheets of metal having a topography such that when the sheets are placed in opposition to each other one or more ducts and/or gaps (32) are defined as a result of the topography. See e.g., U.S. Patent Application No. 20100167105. In this manner, it may be possible for the plates to distribute a fluid (e.g., a gas such as hydrogen or oxygen, a liquid such as a liquid coolant, or both) to or from an electrode.

A fuel cell assembly may include a plurality of fuel cell stacks that are stacked side-by-side relative to each other, one on top of another, or both.

The fuel cell may be assembled in a suitable housing that protects components from environmental conditions such as dust, moisture or the like, as well as protecting external components from any fluids that may escape from the fuel cell.

Figure 3:
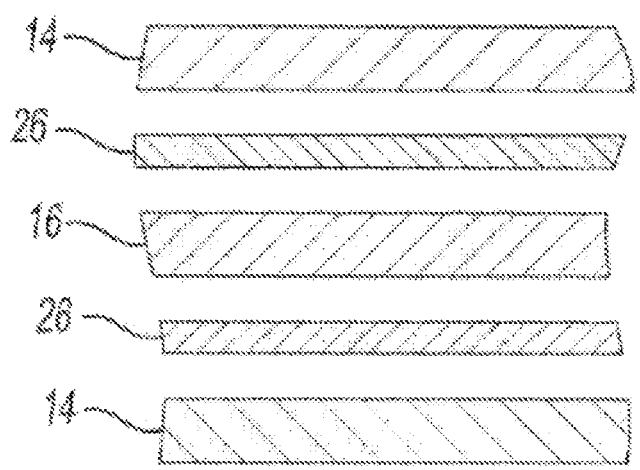
FIG. 3 shows a side profile view of exemplary substrates and reaction product in accordance with the present teachings.
Figure 4:
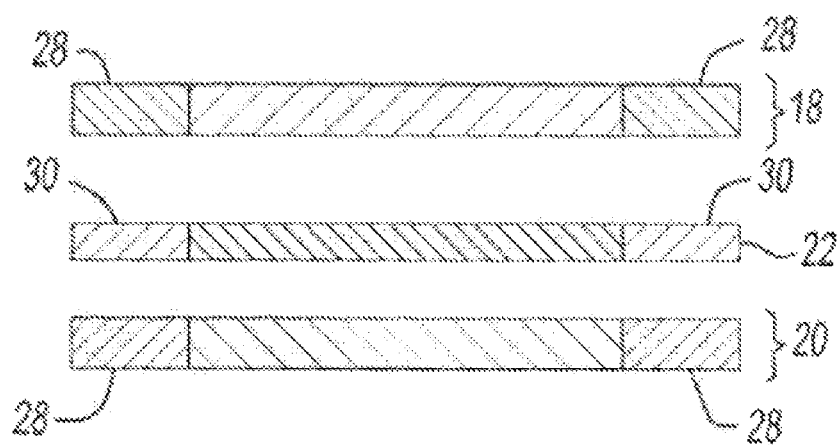
FIG. 4 shows a cross-sectional view of exemplary substrates and reaction product in accordance with the present teachings.

As shown at FIG. 3, one or more adhesive joint 26, which may include a green state adhesive, may be employed for connecting the substrates to each other. One or more adhesive joint 26 may be employed for connecting the substrates to each other with the membrane electrode assembly 16 assembled between them (and one or more plates 14 located adjacent the membrane electrode assembly). The adhesive joint may include the precursor layer or the cured cross-linked reaction product. For example and as shown at FIG. 4, it may be possible that the adhesive of the adhesive joint bonds along an edge of each of the substrates, along an edge 28 of one or more of the electrodes 18, 20 of the membrane electrode assembly, along an edge 30 of the membrane 22, or any combination thereof. The adhesive joint will have a maximum thickness that is below about 0.6 mm, and more preferably below about 0.3 mm. Yet, the thickness of the adhesive joint will be sufficient for withstanding normal operating conditions of the fuel cell without degradation to the bond.

The teachings herein contemplate not only assembled fuel cell assemblies, but also components for assembling together to define a fuel cell assembly. For example, the teachings herein envision subassemblies that include a membrane electrode assembly having a film of a green state adhesive (e.g., at least along an edge portion), a substrate (e.g., a bipolar plate) having a film of a green state adhesive (e.g., at least along an edge portion), or both. The film of green state adhesive may be provided substantially entirely around the perimeter of the components being joined. The film of green state adhesive may be provided substantially entirely along the length of an entire edge of components being joined.

The film may have one or more thicknesses over its volume. The thickness may be generally uniform. The thickness may be below about 600 microns, and more preferably below about 300 microns. The green state adhesive may be such that, while in the green state, more than 50%, 60%, 70%, 80% or even 90% by weight (as established by differential scanning calorimetry) of the resin having groups available for cross-linking remain uncured.

The ability to achieve the above-described fuel cell assemblies is made possible according to the present teachings by the surprising recognition that electromagnetic brush coating techniques can be employed to deposit relatively thin layers of a relatively strong adhesive precursor onto components of a fuel cell assembly. The adhesive precursor (i.e., the adhesive in its green state) is such that it forms a thin film that is generally tack free and dry to the touch, thereby facilitating handling of subassemblies, as fuel cell stacks are built.

A general discussion of electromagnetic brush deposition technology is provided in United States Patent Application 20080268166 (incorporated by reference). See e.g., ¶¶ 4-6. Other examples of electromagnetic application of particulates onto a substrate are illustrated with reference to U.S. Pat. No. 7,481,884.

In brief, particulates of coating materials can be transferred to an electrically active substrate (e.g., one that is electrostatically charged) by using one or more magnetic brushes. The particulates of coating materials are mixed with carrier particles that may have an attractive force. For example, the particulates of coating materials may become electrostatically charged or otherwise made to attract to and adhere to the carrier particles. The resulting carrier/coating material particulate agglomerates are transferred to one or more brush rolls, desirably being magnetized so that the magnetized carrier particles together with the coating material particulates adhering thereto effectively attach to the roll. A suitable electric charge may be applied to the system (e.g., to the brush apparatus and/or to an apparatus that supports the substrate) to cause the coating material particulates to detach from the magnetized carrier particles and transfer to the substrate (e.g., while the substrate is grounded). The carrier particles, in turn, remain with the roll for reclamation and re-use with other coating material particulates.

The coating material particulates may comprise a precursor material that is applied as a layer to a portion of one or more of the substrate surfaces discussed herein. The precursor layer may be comprised of particulates having an average diameter of at least about 5 microns. The precursor layer may be comprised of particulates having an average diameter of less than about 200 microns. The precursor layer may be comprised of particulates having an average diameter of at least about 25 microns and less than about 125 microns. The precursor layer may be comprised of particulates having an average diameter of at least about 20 microns and less than about 150 microns. The precursor layer may be comprised of particulates having an average diameter of at least about 20 microns and less than about 300 microns. The precursor layer may comprise a material that can undergo a physical transformation to form a precursor film layer (e.g., a substantially solid precursor film layer) that bonds to the substrate upon which the precursor layer was initially located. As such, the coating material particulates may fuse together to form the precursor film layer. The precursor layer film may subsequently be activated to define a cross-linked reaction product that bonds the substrate upon which the precursor layer was initially located to an adjacent substrate.

The precursor layer may be formed by an adhesive material located onto the substrate surface in powder form. The adhesive powder is subsequently fused on the substrate surface to form the precursor layer, which is a substantially solid film precursor layer. To sufficiently initially adhere to the substrate and fuse to form the precursor film, the powder form adhesive may be formed of particulates in a particular size range (e.g., particulates having a diameter of between 25 microns and 125 microns) and having a composition that promotes sufficient adhesion of the particulates to the substrate surface while the adhesive is in its green state, thus requiring that the powder adhesive adhere prior to a curing step. Further, upon adhering to the substrate and fusing to form the precursor film layer, the composition of the adhesive powder may be such that the precursor film layer is substantially non-tacky and dry to the touch. The Composition for the adhesive material must be such that the adhesive can be formed in a powder format and that it can remain in a powdered format during transport and storage.

In order to form a desirable adhesive that exists first in powder form, can then fuse to form a film layer, and later be activated to cure, the adhesive (e.g., the precursor layer) may include an epoxy based material. The epoxy may be any dimeric, oligomeric or polymeric epoxy materials containing at least one epoxy functional group. Moreover, the term epoxy can be used to denote one epoxy or a combination of multiple epoxies. The polymer-based materials may be epoxy-containing materials having one or more oxirane rings polymerizable by a ring opening reaction. The precursor layer may include up to about 80% or more of an epoxy. The precursor layer may include between about 2% and 70% by weight epoxy, between about 4% and 30% by weight epoxy, or even between about 7% and 18% by weight epoxy. The epoxy may be aliphatic, cycloaliphatic, aromatic or the like. The epoxy may be supplied as a solid (e.g., as pellets, chunks, pieces or the like) or a liquid. The epoxy may include an ethylene copolymer or terpolymer that may possess an alpha-olefin. Preferably, an epoxy is added to the precursor layer to increase the adhesion, flow properties or both of the precursor layer. The epoxy may include a phenolic resin, which may be a novalac type (e.g., an epoxy phenol novolac, an epoxy cresol novolac, combinations thereof, or the like) or other type resin. Other preferred epoxy containing material includes a bisphenol-A epichlorohydrin ether polymer, or a bisphenol-A epoxy resin which may be modified with butadiene or another polymeric additive. Moreover, various mixtures of several different epoxies may be employed as well. Examples of suitable epoxies are sold under the tradename DER® (e.g., DER 331, DER 661, DER 662), commercially available from the Dow Chemical Company, Midland, Mich.

The epoxy may be combined with a thermoplastic component, which may include styrenics, acrylonitriles, acrylates, acetates, polyamides, polyethylenes or the like. The thermoplastic component may be present in an amount of at least about 5% by weight of the precursor layer. The thermoplastic component may be present in an amount of at least about 20% by weight of the precursor layer. The thermoplastic component may be present in an amount of at least about 60% by weight of the precursor layer. The thermoplastic component may be present in an amount of less than about 80% by weight of the precursor layer. The thermoplastic component may be present in an amount of less than about 30% by weight of the precursor layer.

While it is contemplated that various polymer/elastomer adducts may be employed according to the present invention, one preferred adduct is an epoxy/elastomer adduct. The precursor layer may thus include an elastomer-containing adduct. The epoxy/elastomer hybrid or adduct may be included in an amount of up to about 80% by weight of the precursor layer. The elastomer-containing adduct may be approximately at least 5%, more typically at least 7% and even more typically at least 10% by weight of the precursor layer. The adduct may be up to 60% or more, but more preferably is about 10% to 30% by weight of the precursor layer. Of course, the elastomer-containing adduct may be a combination of two or more particular adducts and the adducts may be solid adducts or liquid adducts at a temperature of 23° C. or may also be combinations thereof. The adduct may be composed of substantially entirely (i.e., at least 70%, 80%, 90% or more) of one or more adducts that are solid at a temperature of 23° C.

The adduct itself generally includes about 1:8 to 3:1 parts of epoxy or other polymer to elastomer, and more preferably about 1:5 to 1:6 parts of epoxy to elastomer. More typically, the adduct includes at least about 5%, more typically at least about 12% and even more typically at least about 18% elastomer and also typically includes not greater than about 50%, even more typically no greater than about 40% and still more typically no greater than about 35% elastomer, although higher or lower percentages are possible. The elastomer compound may be a thermosetting elastomer. Exemplary elastomers include, without limitation, natural rubber, styrene-butadiene rubber, polyisoprene, polyisobutylene, polybutadiene, isoprene-butadiene copolymer, neoprene, nitrile rubber (e.g., a butyl nitrile, such as carboxy-terminated butyl nitrile (CTBN)), butyl rubber, polysulfide elastomer, acrylic elastomer, acrylonitrile elastomers, silicone rubber, polysiloxanes, polyester rubber, diisocyanate-linked condensation elastomer, EPDM (ethylene-propylene diene rubbers), chlorosulphonated polyethylene, fluorinated hydrocarbons and the like. An example of a preferred epoxy/elastomer adduct is sold under the tradename HYPDX commercially available from CVC Chemical. Examples of additional or alternative epoxy/elastomer or other adducts suitable for use in the present invention are disclosed in U.S. Patent Publication 2004/0204551, which is incorporated herein by reference for all purposes.

The elastomer-containing adduct, when added to the activatable material, may modify structural properties of the activatable material such as strength, toughness, stiffness, flexural modulus, or the like.

The precursor layer may also include at least one impact modifier. Various impact modifiers may be employed in the practice of the present invention and often include one or more elastomers. The impact modifier may be at least 4%, at least 7%, at least 10%, at least 13% and even still more typically at least 16% by weight of the precursor layer. The impact modifier may be less than 90%, less than 40% or even less than about 30% by weight of the precursor layer.

The impact modifier may include at least one core/shell impact modifier. The impact modifier may be compromised of at least 60%, at least 80% or even at least 95% core/shell impact modifier. As used herein, the term core/shell impact modifier denotes an impact modifier wherein a substantial portion (e.g., greater than 30%, 50%, 70% or more by weight) thereof is comprised of a first polymeric material (i.e., the first or core material) that is substantially entirely encapsulated by a second polymeric material (i.e., the second or shell material). The first and second polymeric materials, as used herein, can be comprised of one, two, three or more polymers that are combined and/or reacted together (e.g., sequentially polymerized) or may be part of separate or same core/shell systems.

The first and second polymeric materials of the core/shell impact modifier can include elastomers, polymers, thermoplastics, copolymers, other components, combinations thereof or the like. The first polymeric material, the second polymeric material or both of the core/shell impact modifier may include or may be substantially entirely composed of (e.g., at least 70%, 80%, 90% or more by weight) one or more thermoplastics. Exemplary thermoplastics include, without limitation, styrenics, acrylonitriles, acrylates, acetates, polyamides, polyethylenes or the like.

Examples of useful core-shell graft copolymers are those where hard containing compounds, such as styrene, acrylonitrile or methyl methacrylate, are grafted onto core made from polymers of soft or elastomeric containing compounds such as butadiene or butyl acrylate. The core polymer may also include other copolymerizable containing compounds, such as styrene, vinyl acetate, methyl methacrylate, butadiene, isoprene, or the like. The core polymer material may also include a cross linking monomer having two or more nonconjugated double bonds of approximately equal reactivity such as ethylene glycol diacrylate, butylene glycol dimethacrylate, and the like. The core polymer material may also include a graft linking monomer having two or more nonconjugated double bonds of unequal reactivity such as, for example, diallyl maleate and allyl methacrylate. The shell portion may be polymerized from methyl methacrylate and optionally other alkyl methacrylates, such as ethyl, butyl, or mixtures thereof methacrylates. Additional core-shell graft copolymers useful in embodiments of the present invention are described in U.S. Pat. Nos. 3,984,497; 4,096,202; 4,034,013; 3,944,631; 4,306,040; 4,495,324; 4,304,709; 4,536,436; and 7,892,396, the entireties of which are herein incorporated by reference herein. Examples of suitable core-shell graft copolymers include, but are not limited to, "MBS" (methacrylate-butadiene-styrene) polymers, which are made by polymerizing methyl methacrylate in the presence of polybutadiene or a polybutadiene copolymer rubber. The MBS graft copolymer resin generally has a styrene butadiene rubber core and a shell of acrylic polymer or copolymer. Examples of other useful core-shell graft copolymer resins include, ABS (acrylonitrile-butadiene-styrene), MABS (methacrylate-acrylonitrile-butadiene-styrene), ASA (acrylate-styrene-acrylonitrile), all acrylics, SA EPDM (styrene-acrylonitrile grafted onto elastomeric backbones of ethylene-propylene diene monomer), MAS (methacrylic-acrylic rubber styrene), and the like and mixtures thereof.

The precursor layer may also include one or more curing agents and/or curing agent accelerators. Amounts of curing agents and curing agent accelerators may vary within the precursor layer depending upon the type of cellular structure desired and the desired structural properties of the precursor layer. Exemplary ranges for the curing agents or curing agent accelerators present in the precursor layer range from about 0.001% by weight to about 7% by weight. The curing agents assist the precursor layer in curing by crosslinking of the polymers, epoxy resins or both. The curing agents may also assist in thermosetting the precursor layer. Useful classes of curing agents are materials selected from aliphatic or aromatic amines or their respective adducts, amidoamines, polyamides, cycloaliphatic amines, anhydrides, polycarboxylic polyesters, isocyanates, phenol-based resins (e.g., phenol or cresol novolak resins, copolymers such as those of phenol terpene, polyvinyl phenol, or bisphenol-A formaldehyde copolymers, bishydroxyphenyl alkanes or the like), or mixtures thereof. The curing agents may include modified and unmodified polyamines or polyamides such as triethylenetetramine, diethylenetriamine tetraethylenepentamine, cyanoguanidine, dicyandiamides and the like. An accelerator for the curing agents (e.g., a modified or unmodified urea such as methylene diphenyl bis urea, an imidazole or a combination thereof) may also be provided for preparing the precursor layer.

The precursor layer may also include one or more fillers, including but not limited to particulated materials (e.g., powder), beads, microspheres, or the like. The precursor layer may also be substantially free of any filler material. The precursor layer may include a filler that comprises less than 25% by weight of the precursor material. Ideally, the filler may comprise less than about 2.5% by weight of the precursor layer. Any filler present may include a material that is generally non-reactive with the other components present in the precursor layer. Examples of fillers include silica, diatomaceous earth, glass, clay (e.g., including nanoclay), talc, pigments, colorants, glass beads or bubbles, glass, carbon or ceramic fibers, nylon or polyamide fibers (e.g., Keviar), antioxidants, and the like. Such fillers, particularly clays, can assist the activatable material in leveling itself during flow of the material. The clays that may be used as fillers may include clays from the kaolinite, illite, chloritem, smecitite or sepiolite groups, which may be calcined. Examples of suitable fillers include, without limitation, talc, vermiculite, pyrophyllite, sauconite, saponite, nontronite, montmorillonite or mixtures thereof. The clays may also include minor amounts of other ingredients such as carbonates, feldspars, micas and quartz. The fillers may also include ammonium chlorides such as dimethyl ammonium chloride and dimethyl benzyl ammonium chloride. Titanium dioxide might also be employed.

Advantageously, the precursor layer of the present teachings can exhibit relatively high impact resistance. The precursor layer, particularly for certain combinations and amounts of ingredients (e.g., combination of certain amounts of adduct, amounts of impact modifier or both) as disclosed herein, can exhibit desirable toughness and/or T-peel strengths. As an example, the adhesive material of the present invention has been found to exhibit, according to ASTM D 1876-01, T-peel strengths of at least about 2 N/mm, at least about 3.7 N/mm or even at least about 5.5 N/mm.

The lap shear strengths of the precursor layer are determinable according to ASTM D1002-01. Lap shear strength of the precursor layer at 73.4° F. may be greater than about 1000 psi, often greater than about 2000 psi, can be greater than 3000 psi and can even be greater than about 3500 psi. Lap shear strength of the adhesive material at −67° F. is often greater than about 1000 psi, often greater than about 2000 psi, can be greater than 2200 psi and can even be greater than about 3000 psi.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "x parts by weight of the resulting polymeric blend composition" also contemplates a teaching of ranges of same recited amount of "x in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of, or even consists of, the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps. All references herein to elements or metals belonging to a certain Group refer to the Periodic Table of the Elements published and copyrighted by CRC Press, Inc., 1989. Any reference to the Group or Groups shall be to the Group or Groups as reflected in this Periodic Table of the Elements using the IUPAC system for numbering groups.

It will be appreciated that concentrates or dilutions of the amounts recited herein may be employed. In general, the relative proportions of the ingredients recited will remain the same. Thus, by way of example, if the teachings call for 30 parts by weight of a Component A, and 10 parts by weight of a Component B, the skilled artisan will recognize that such teachings also constitute a teaching of the use of Component A and Component B in a relative ratio of 3:1. Teachings of concentrations in the examples may be varied within about 25% (or higher) of the stated values and similar results are expected. Moreover, such compositions of the examples may be employed successfully in the present methods.

It will be appreciated that the above is by way of illustration only. Other ingredients may be employed in any of the compositions disclosed herein, as desired, to achieve the desired resulting characteristics. Examples of other ingredients that may be employed include antibiotics, anesthetics, antihistamines, preservatives, surfactants, antioxidants, unconjugated bile acids, mold inhibitors, nucleic acids, pH adjusters, osmolarity adjusters, or any combination thereof.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not It is understood that the above description is intended to be illustrative and not restrictive. Many embodiments as well as many applications besides the examples provided will be apparent to those of skill in the art upon reading the above description.

The explanations and illustrations presented herein are intended to acquaint others skilled in the art with the invention, its principles, and its practical application. Those skilled in the art may adapt and apply the teachings in their numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

What is claimed is:

1. A method for forming a fuel cell stack, comprising the steps of:
   a) providing a plurality of die-cut stainless steel sheets each having (i) a thickness of less than 0.2 mm, (ii) a first face, and (iii) an opposing second face;
   b) using an electromagnetic brush printing apparatus to electrostatically deliver a precursor layer having a uniform thickness of less than 0.3 mm onto a first face of the plurality of die-cut stainless steel sheets, wherein the precursor layer has particles having an average diameter of at least 25 microns and less than 125 microns, and having a one component substantially solid precursor formulation including:
      i) a solid bisphenol A based epoxy in an amount greater than 80 percent by weight of the composition;
      ii) a solid epoxy carboxy-terminated butyl nitrile (epoxy-CTBN) adduct, having an epoxide equivalent weight of 1500 g/mole, the solid epoxy-CTBN being present in an amount of between 1:5 to 1:6 parts by weight relative to the solid bisphenol A based epoxy;
      iii) a dicyanamide curing agent in are amount of e than 4 percent by weight of the composition; and
      iv) at least one pigment in an amount of less than 2.5% by weight of the precursor layer;
   c) physically transforming the particles of the precursor layer to form a precursor layer film that is tack-free while on a respective die-cut stainless steel sheet to which it has been delivered and thereby forming at least a temporary adhesive bond between the precursor layer and the die-cut stainless steel sheet;
   d) heating each precursor layer film to a temperature above a cross-linking activation temperature for cross-linking the solid bisphenol A based epoxy and the solid epoxy-CTBN adduct to define a cross-linked reaction product material layer;
   e) forming a stack of at least 200 of the die-cut stainless steel sheets having the cross-linked reaction product material layer thereon by stacking consecutive sheets so that respective first faces of the sheets oppose respective second faces of the sheets with a respective cross-linked reaction product material layer therebetween, and thereby defining an outermost cross-linked reaction product material layer;
   f) sandwiching a plurality of membrane electrode assemblies, each including an anode, a cathode, and a membrane between the anode and the cathode, between the plurality of die-cut stainless steel sheets;
   g) bonding the consecutive sheets to each other while maintaining a gap between a portion of each adjoining substrate; and
   h) applying a die-cut stainless steel cover sheet over the outer most cross-linked reaction product material layer thereby defining a fuel cell stack.

2. The method of claim 1, wherein the step of physically transforming the particles occurs prior to stacking adjoining sheets upon each other.

3. The method of claim 1, wherein the step of heating each precursor layer film occurs prior to the step of stacking.

4. The method of claim 2, wherein the step of heating each precursor layer film occurs substantially simultaneously after the step of stacking.

5. The method of claim 1, wherein the step of physically transforming the particles includes a step of heating the particles to a temperature of at least 80° C. less than the temperature for the step of heating each precursor layer film.

6. The method of claim 2, wherein the step of physically transforming the particles includes a step of heating the particles to a temperature of at least 80° C. less than the temperature for the step of heating each precursor layer film.

7. The method of claim 3, wherein the step of physically transforming the particles includes a step of heating the particles to a temperature of at least 80° C. less than the temperature for the step of heating each precursor layer film.

8. The method of claim 4, wherein the step of physically transforming the particles includes a step of heating the particles to a temperature of at least 80° C. less than the temperature for the step of heating each precursor layer film.

9. The method of claim 1, wherein the step of physically transforming the particles includes heating the particles to a temperature at which the precursor composition softens and flows as a thermoplastic material, but below which it will cross-link for forming a thermoset material.

10. The method of claim 2, wherein the step of physically transforming the particles includes heating the particles to a temperature at which the precursor composition softens and flows as a thermoplastic material, but below which it will cross-link for forming a thermoset material.

11. The method of claim 3, wherein the step of physically transforming the particles includes heating the particles to a temperature at which the precursor composition softens and flows as a thermoplastic material, but below which it will cross-link for forming a thermoset material.

12. The method of claim 4, wherein the step of physically transforming the particles includes heating the particles to a temperature at which the precursor composition softens and flows as a thermoplastic material, but below which it will cross-link for forming a thermoset material.

13. The method of claim 5, wherein the step of physically transforming the particles includes heating the particles to a temperature at which the precursor composition softens and flows as a thermoplastic material, but below which it will cross-link for forming a thermoset material.

14. A fuel cell comprising a fuel cell stack prepared using the method of claim 1.

15. A fuel cell comprising a fuel cell stack prepared using the method of claim 13.

16. A fuel cell stack, comprising:
   a) a plurality of die-cut stainless steel sheets each having (i) a thickness of less than 0.2 mm, (ii) a first face, and (iii) an opposing second face;
   b) a layer disposed between one or more consecutive sheets of a cured cross-linked reaction product of a one component formulation comprising:
      i) a solid bisphenol A based epoxy in an amount greater than 80 percent by weight of the composition;
      ii) a solid epoxy carboxy-terminated butyl nitrile (epoxy-CTBN) adduct, having an epoxide equivalent weight of 1500 g/mole, the solid epoxy-CTBN being present in an amount of between 1:5 to 1:6 parts by weight relative to the solid bisphenol A based epoxy;
      iii) a dicyanamide curing agent n an amount of less than 4 percent by weight of the composition; and
      iv) at least one pigment in an amount of less than 2.5% by weight of the precursor layer; and
   c) a plurality of membrane electrode assemblies, each including an anode, a cathode, and a membrane between the anode and the cathode, wherein at least one of the plurality of membrane electrode assemblies is sandwiched between the one or more consecutive sheets;

wherein the layer disposed between the one or more consecutive sheets is of sufficient thickness and is located so as to define a gap into which a fluidic material can be introduced and distributed to or from the plurality of membrane electrode assemblies of a fuel cell.

17. A method for forming a subassembly of a fuel cell stack, comprising the steps of:
a) providing a plurality of die-cut stainless steel sheets each having (i) a thickness of less than 0.2 mm, (ii) a first face, and (iii) an opposing second face;
b) using an electromagnetic brush printing apparatus to electrostatically deliver a precursor layer having a uniform thickness of less than 0.3 mm onto the first face and the opposing second face of the plurality of die-cut stainless steel sheets, wherein the precursor layer has particles having an average diameter of at least 25 microns and less than 125 microns, and having a one component substantially solid precursor formulation including:
   i) a solid bisphenol A based epoxy in an amount greater than 80 percent by weight of the composition;
   ii) a solid epoxy carboxy-terminated butyl nitrile (epoxy-CTBN) adduct, having an epoxide equivalent weight of 1500 g/mole, the solid epoxy-CTBN being present in an amount of between 1:5 to 1:6 parts by weight relative to the solid bisphenol A based epoxy;
   iii) a dicyanamide curing agent in an amount of less than 4 percent by weight of the composition; and
   iv) at least one pigment in the precursor layer;
(c) physically transforming the particles of the precursor layer to form a precursor layer film that is tack-free while on a respective die-cut stainless steel sheet to which it has been delivered and thereby forming at least a temporary adhesive bond between the precursor layer and the die-cut stainless steel sheet;
(d) heating each precursor layer film to a temperature above a cross-linking activation temperature for cross-linking the solid bisphenol A based epoxy and the solid epoxy-CTBN adduct to define a cross-linked reaction product material layer;
(e) forming a stack of at least 200 of the die-cut stainless steel sheets having the cross-linked reaction product material layer thereon by stacking consecutive sheets so that respective first faces of the sheets oppose respective second faces of the sheets with respective cross-linked reaction product material layers therebetween, and thereby defining an outermost cross-linked reaction product material layer;
(f) bonding the consecutive sheets to each other while maintaining a gap between a portion of each adjoining substrate; and
(g) applying a die-cut stainless steel cover sheet over the outermost cross-linked reaction product material layer thereby defining a subassembly of a fuel cell stack.

18. A subassembly of a fuel cell stack, comprising:
a) a plurality of die-cut stainless steel sheets each having (i) a thickness of less than 0.2 mm, (ii) a first face, and (iii) an opposing second face; and
b) a layer disposed between one or more consecutive sheets of a cured cross-linked reaction product of a one component formulation comprising:
   i) a solid bisphenol A based epoxy in an amount greater than E percent by weight of the composition;
   ii) a solid epoxy carboxy-terminated butyl nitrile (epoxy-CTBN) adduct, having an epoxide equivalent weight of 1500 g/mole, the solid epoxy-CTBN being present in an amount of between 1:5 to 1:6 parts by weight relative to the solid bisphenol A based epoxy;
   iii) a dicyanamide curing agent in an amount of less than 4 percent by weight of the composition; and
   iv) at least one pigment in the precursor layer;
wherein the layer disposed between the one or more consecutive sheets is of sufficient thickness and is located so as to define a duct into which a fluidic material can be introduced and distributed to or from one or more membrane electrodes of a fuel cell.

\* \* \* \* \*

UNITED STATES PATENT AND TRADEMARK OFFICE
CERTIFICATE OF CORRECTION

PATENT NO. : 8,921,009 B2  
APPLICATION NO. : 13/561442  
DATED : December 30, 2014  
INVENTOR(S) : Czaplicki et al.

Page 1 of 1

It is certified that error appears in the above-identified patent and that said Letters Patent is hereby corrected as shown below:

In the Claims

Column 11, Claim 1, Line 25 "are" should be "an"

Column 11, Claim 1, Line 25 "e" should be "less"

Signed and Sealed this  
Fourteenth Day of April, 2015

Michelle K. Lee  
*Director of the United States Patent and Trademark Office*